(12) United States Patent
Rehbein et al.

(10) Patent No.: US 6,685,188 B2
(45) Date of Patent: Feb. 3, 2004

(54) METHOD AND APPARATUS FOR PERFORMING A TRANSACTION WITHOUT THE USE OF SPOKEN COMMUNICATION BETWEEN THE TRANSACTION PARTIES

(76) Inventors: Jürg Rehbein, 574 West-End Ave. #54, New York, NY (US) 10024; Leah Demchick, 574 West-End Ave. #54, New York, NY (US) 10024; Andres Fehr, 3-18-12 Sengen-cho Higashi-kurume-shi, Tokyo (JP), 203-0012; Maki Oshima-Fehr, 3-18-12 Sengen-cho Higashi-kurume-shi, Tokyo (JP), 203-0012

( * ) Notice: Subject to any disclaimer, the term of this patent is extended or adjusted under 35 U.S.C. 154(b) by 188 days.

(21) Appl. No.: 10/144,513

(22) Filed: Oct. 25, 2001

(65) Prior Publication Data

US 2003/0082504 A1 May 1, 2003

(51) Int. Cl.7 .................................................... A63F 1/00
(52) U.S. Cl. ........................ 273/299; 434/156; 434/157; 434/185; 705/26
(58) Field of Search ................................. 273/292–299; 434/112, 118, 156, 157, 159, 167, 169, 185, 307 R, 308, 365; 705/1, 14, 26, 35; 704/213, 235, 260; 345/752, 839; 700/231, 233, 241; 235/380, 439, 472.01, 472.02; 283/45, 46; D19/1

(56) References Cited

U.S. PATENT DOCUMENTS

| | | |
|---|---|---|
| 422,682 A | 3/1890 | Young |
| 698,603 A | 4/1902 | Wiederseim, Jr. |
| 1,292,184 A | 1/1919 | Wells |
| 1,581,859 A | 4/1926 | McLaen New |
| 1,617,772 A | 2/1927 | Sergel et al. |
| 1,617,773 A | 2/1927 | Sergel et al. |
| 3,566,483 A | 3/1971 | Axelrod |
| 4,445,869 A | 5/1984 | Wasserman |
| D278,833 S | 5/1985 | Harley |
| 4,774,666 A * | 9/1988 | Miyao et al. ................... 704/2 |
| 4,957,443 A | 9/1990 | Schwartz |
| 5,094,465 A | 3/1992 | Dawson |
| 5,100,326 A | 3/1992 | Leep et al. |
| 5,180,306 A | 1/1993 | McInroy et al. |
| 5,492,473 A | 2/1996 | Shea |
| 5,576,953 A | 11/1996 | Hugentobler |
| 5,607,310 A | 3/1997 | Cholley |
| 5,733,128 A | 3/1998 | Getz |
| 5,742,779 A * | 4/1998 | Steele et al. ................. 345/839 |
| 5,743,740 A | 4/1998 | Visser et al. |
| 5,803,742 A | 9/1998 | Buti |
| 5,810,599 A | 9/1998 | Bishop |
| 5,816,574 A | 10/1998 | Holmes |
| 5,863,043 A | 1/1999 | Bitner |
| 5,865,625 A | 2/1999 | Baskerville |
| 5,868,393 A * | 2/1999 | Williams ...................... 273/299 |
| 5,882,202 A | 3/1999 | Sameth et al. |
| 5,885,081 A | 3/1999 | Tamura et al. |

(List continued on next page.)

FOREIGN PATENT DOCUMENTS

EP        0 180 888 B1 *   2/1995

Primary Examiner—Joe H. Cheng
(74) Attorney, Agent, or Firm—Pennie & Edmonds, LLP

(57) ABSTRACT

A method for performing a transaction without the use of spoken communication is disclosed. The method consists of providing at least one transactional flash card having information about the transaction and the transaction goal displayed on the card in text understandable to the user and different text understandable to the party from whom the user wishes to purchase goods or services. The method may include displaying such a flash card in printed form, or on a personal electronic device. The method may further include providing flash cards having inquiries about price, payment methods, or shipping terms. Also disclosed are transactional flash cards used with the method.

29 Claims, 9 Drawing Sheets

U.S. PATENT DOCUMENTS

| | | |
|---|---|---|
| 5,974,372 A | 10/1999 | Barnes et al. |
| D418,542 S | 1/2000 | Cormier et al. |
| 6,024,571 A | 2/2000 | Renegar |
| 6,234,803 B1 * | 5/2001 | Watkins ...................... 434/156 |
| 6,390,820 B1 * | 5/2002 | Landman .................... 434/112 |
| 6,490,563 B2 * | 12/2002 | Hon et al. .................. 704/260 |
| 6,509,910 B1 * | 1/2003 | Agarwal et al. ............ 345/752 |
| 6,575,468 B1 * | 6/2003 | Hall ........................... 273/298 |
| 6,588,756 B1 * | 7/2003 | Hughes ...................... 273/292 |
| 2002/0004744 A1 * | 1/2002 | Muyres et al. ................ 705/14 |
| 2002/0026396 A1 * | 2/2002 | Dent et al. .................... 705/35 |
| 2002/0137012 A1 * | 9/2002 | Hohl .......................... 434/156 |
| 2002/0169691 A1 * | 11/2002 | Yukimachi et al. ........... 705/26 |

\* cited by examiner

METHOD AND APPARATUS FOR PERFORMING A TRANSACTION WITHOUT THE USE OF SPOKEN COMMUNICATION BETWEEN THE TRANSACTION PARTIES

BACKGROUND OF THE INVENTION

The field of the invention relates generally to methods and devices for facilitating transactions between two parties who don't understand each other, such as, for example, two individuals who do not speak the same language. The present invention pertains to transactional flash cards, and a method of using transactional flash cards to perform a transaction with another party who doesn't understand the user. Using the flash cards of the present invention, the user does not need to read, speak or even pronounce a word to the other party to the transaction, but instead may simply present a selected transactional flash card to the other party to communicate the goal and intent of the transaction.

Existing translational communication aids are conceived to teach or assist a person in learning, reading or speaking a foreign language. This means that such aids are not designed to perform a transaction for the user by clearly communicating the goal of the transaction to another party. Instead, existing translational communication aids are designed to teach someone how to speak and communicate in that foreign language. Transactional flash cards are actually quite the opposite; they circumvent the need to learn, memorize or even pronounce a word or a phrase.

Existing, traditional translation devices may be difficult to use in performing a specific transaction. This is because translation devices are conceived for different purposes such as lexical (dictionaries) or educational purposes and not specifically for performing a transaction whereby the user does not have to learn, read, speak or even pronounce a word in the other party's language.

Educational flash cards are known. These cards may contain an image of an object and its name, but are designed to teach an individual to memorize/learn a word. With their elementary vocabulary and their functionality as a teaching device, educational flash cards can not and are not meant to communicate and perform a transaction for a user who doesn't understand and is not understood by the party he or she wants to perform the transaction with. For example a traveler in a foreign place would not be served in conducting a transaction with such educational flash cards. Such an individual needs a more specifically structured device which communicates and performs a transaction for him or her. Such a transaction could be, for example, ordering food in a restaurant where no one speaks the card holder's language. In their structure, educational flash cards do not have at least two basic elements: 1. A name of the goal of the transaction and a statement of intent (such as a phrase to describe the intent to order food) displayed in the language of the second party and in the language of the cardholder, and 2. the essential information regarding the goal of the transaction displayed in the cardholder's language. As in the above example of ordering food, a mere translation of the name of a meal using an educational flash card may not mean anything to the cardholder because he or she would not be familiar with the colloquial nature of the name of a meal. Additionally, there might not even be a name for a particular meal in the cardholder's language (for example it is difficult to translate "chirashi sushi" into English, as one may only spell it phonetically in the latin alphabet, which would not help a cardholder to know what he or she is ordering).

Dictionaries generally do not contain terms of transactional goals such as the names of merchandise etc. because they are typically used for text translations. They are also not normally useful for visual communications because of their traditionally small print and because they contain negligible imagery.

Travel brochures may contain imagery with information about a place or custom but are not useful in aiding transactions between two parties who don't speak the same language.

Travel guides may have short glossaries of useful terms, but contain little if any imagery. They are also organized in a format which makes their use cumbersome in attempting to display an idea or the goal of a transaction to a second party. An additional disadvantage with both travel guides and brochures is that the traveler still has to learn to pronounce a word or phrase correctly to ensure proper understanding by another party. Travel guides and brochures are conceived for an informative, and not a transactional purpose, and as such they aid the user little in performing a transaction.

In summary, known translation devices are not transactional tools, and as such they provide little assistance to a user in performing a transaction with a second party who doesn't speak the user's language.

It is the object of the present invention to provide transactional flash cards that will assist the user in performing a transaction with another party without spoken communication between the user and the other party. For example, if the user and the other party speak two different languages it is unnecessary for the user to speak, read, or even pronounce word to of the other party.

SUMMARY OF THE INVENTION

The present invention provides a method of performing a transaction without the use of spoken communication between the parties to the transaction, comprising the steps of: providing at least one transactional flash card displaying text understandable to the user and different text understandable to the other party and an image, both texts and the image describing the same transaction goal; and selecting the flash card to communicate the transaction goal so that when the user presents the flash card to the other party the goal of the transaction is communicated that party.

The step of providing at least one transactional flash card may further comprise providing the transactional flash cards with a phrase in separate sets of text, one understandable to the user and a second understandable to the other party describing an intent to perform the same transaction and to achieve the same goal. The step of providing at least one transactional flash card may additionally comprise providing a transactional flash card which displays information additional to the text describing the transaction goal, and which additional text is understandable to user, where such additional information is not displayed as text understandable to the other party. The step of providing at least one transactional flash card may also comprise providing a transactional flash cards having at least one icon containing condensed information about the transaction goal. The step of providing at least one transactional flash card may additionally comprise providing a transactional flash card containing an inquiry as to the price of the transaction. The step of providing at least one transactional flash card may further comprise providing a transactional flash card containing text, or an icon, inquiring whether the second party prefers a particular form of payment. The step of providing at least one transactional flash card may also comprise providing a transactional flash card having an erasable surface.

In a different embodiment, the step of providing at least one transactional flash card may also comprise providing transactional flash cards as a set of 52 cards, where each flash card in the set comprises a different playing card suit (e.g. hearts, diamonds, spades or clubs) and a different number (e.g. deuce through ace), such that the set comprises a deck of standard playing cards.

In another embodiment of the present method, the step of providing at least one transactional flash card may further comprise providing a transactional flash card on an electronic device having a computer memory and a display screen, where the step of providing a transactional flash card comprises providing the flash card in the computer memory so that the flash card may be viewed on the display screen. The step of providing at least one transactional flash card may also comprise providing a transactional flash card on an electronic device capable of receiving removable memory media, such as CD, memory stick, etc. The step of providing at least one transactional flash card may also comprise providing a transactional flash card on an electronic device containing at least one prompt to allow the first party to view on the display screen information stored in the removable memory media. The step of providing at least one transactional flash card may also comprise providing a transactional flash card on an electronic device capable of connecting to the internet, where the electronic device has a prompt providing a link to an internet site, and the link may comprise a connection to a financial institution capable of performing payment transactions upon an instruction from a user of the electronic device, or the link may comprise a connection to an internet site capable of providing additional transactional flash cards to the electronic device.

In yet another embodiment of the present method, the step of providing at least one transactional flash card may also comprise providing a transactional flash card on an electronic device further comprising a calculator capable of performing and displaying at least basic mathematical functions. The step of providing at least one transactional flash card may also comprise providing a transactional flash card on an electronic device capable of calculating and displaying an exchange rate and currency conversion for currencies of at least two different countries. The step of providing at least one transactional flash card may also comprise providing a transactional flash card on an electronic device may also comprise providing an electronic device capable of connecting to the internet and capable of calculating and displaying exchange rates for currencies of at least two different countries, where the electronic device communicates with at least one internet site to automatically obtain and display an exchange rate and currency conversion when the names of two countries and one money amount are input to the device.

In a further embodiment of the present method, the step of providing at least one transactional flash card may also comprise providing a transactional flash card on an electronic device having a surface on which information may be entered into the device using a stylus, and further where such entered information may be displayed on the screen.

In a different embodiment of the present method, the step of providing an electronic device may further comprise providing an electronic device having a microphone and a display screen, where the device may record sound entered using the microphone and display a representation of the sound on the display screen.

In still another embodiment of the present method, the step of providing an electronic device may further comprise providing an electronic device capable of converting text that is understandable to the user holding the electronic device to an audible message that is understandable to another party, where when the user presents the electronic device to the other party, the goal of the transaction is communicated to that other party when that party listens to the audible message.

The present invention also provides a device for facilitating a transaction having a goal between parties who don't understand each other, comprising at least one transactional flash card having a front side and a back side, at least the front side having a display comprising text understandable to the user and different text understandable to the other party, and an image, where both the texts and the image describe the same transaction goal. The transactional flash card front or back side may also contain a phrase in texts understandable to both parties describing an intent to perform the transaction goal. The transactional flash card front or back side may further contain information understandable to the user that is additional to the text describing the transactional goal and phrase, where the additional information is not understandable to the other party to the transaction. The transactional flash card may also contain an erasable surface. The transactional flash cards may be provided as a set of 52 cards, where each flash card in the set comprises a different playing card suit (e.g. hearts, diamonds, spades or clubs) and a different number (e.g. deuce through ace), such that the set comprises a deck of standard playing cards.

In another embodiment, the transactional flash cards may be provided on an electronic device having a computer memory and a display screen, where the transactional flash card is displayed in electronic form on the screen. The electronic device may also comprise a calculator. The electronic device may also have a connection enabling communication with the internet.

BRIEF DESCRIPTION OF THE DRAWINGS

The features and advantages of the present invention will become more readily apparent from the following detailed description of the invention in which like elements are labeled similarly and in which.

DETAILED DESCRIPTION OF THE PREFERRED EMBODIMENTS

Figure 1:
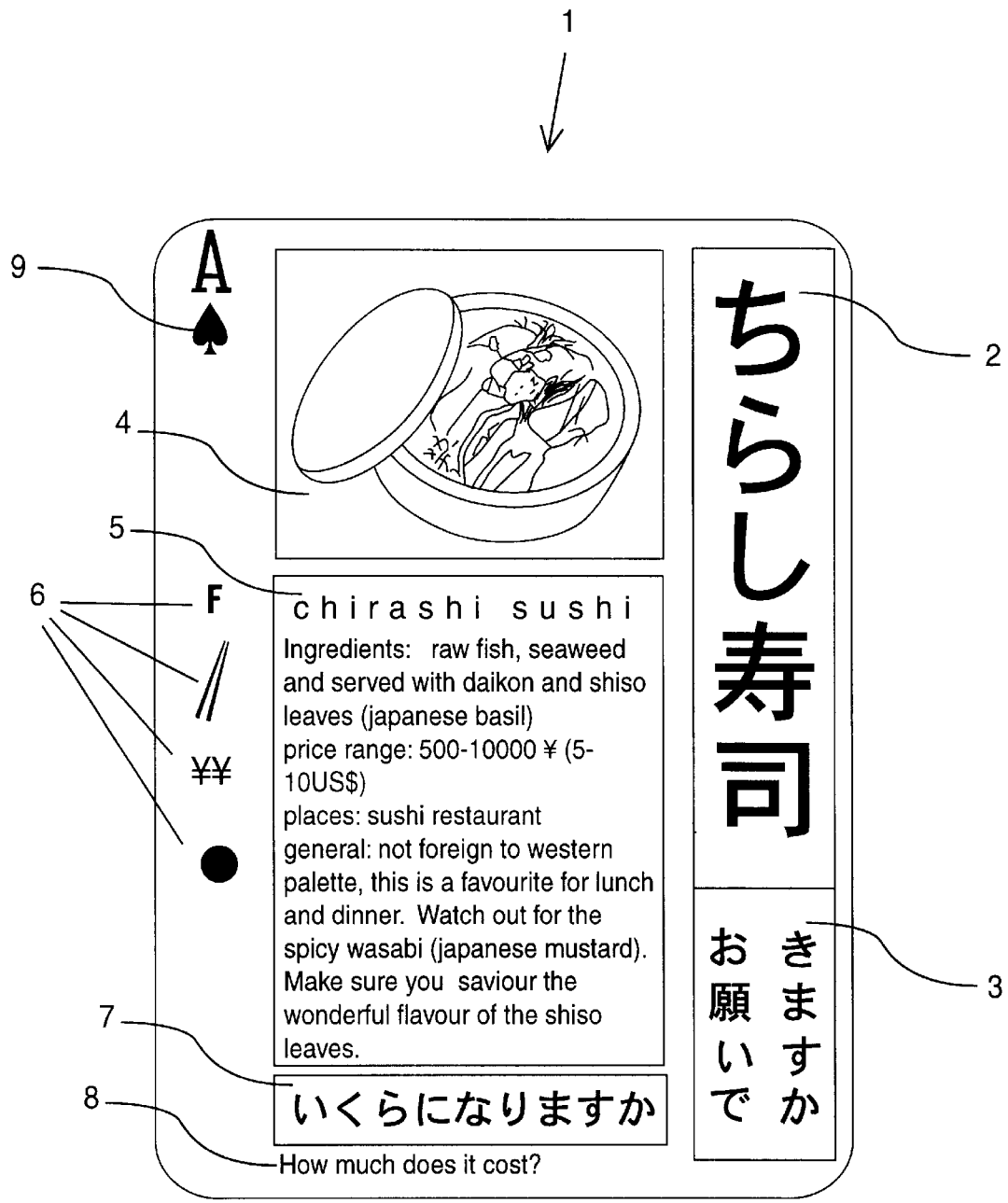
FIG. 1 is a top view of a transactional flash card of the current invention.

The preferred embodiment discloses a method of performing a transaction between a first party who understands a first language and a second party who understands a second language, where the communication impediment between the two parties is that the two parties don't understand each other's language. Several other impediments in communicating the intent to perform a transaction may exist, such as, for example, where the physical noise level is too high for them to hear each other; or where to the first party a trade specific terminology might be meaningless or hard to remember, but without it a transaction couldn't take place because the second party requires the goal of the transaction to be described with that specific terminology. Having shown further communication impediments we in no way mean to limit the invention to the description of the preferred embodiments, and from other applications for the claimed device may arise from numerous other communication impediments.

The disclosed method obviates the need for the cardholder to learn, speak or even pronounce a foreign language to describe the goal and the intent of a transaction because the transactional flash cards themselves communicate the desired transaction clearly with a second party who does not speak the language of the first party. The transactional flash cards go allow the cardholder to perform the transaction without the cardholder having to communicate in any other way with the second party.

The following terminology will be referred to throughout this description. "Cardholder" refers to the person possessing the transactional flash cards. The cardholder may, for example, be a traveler to a foreign country, but there are many applications for the transactional flash cards in the cardholder's homeland, especially in today's multicultural cities. Additionally, communication difficulties are not limited to language difficulties alone therefore other uses might arise from any situation where two parties have difficulties understanding each other (e.g. a high noise level where speech is difficult or impossible; or a very technical, specialized language in which only one party is versed; or any other situation where two parties have difficulties communicating.)

The term "another or second party" includes any person or group of persons who do not understand the cardholder and who the cardholder tries to transact with by communicating the goal and the intent of a transaction through use of the transactional flash cards. It should be noted that the cardholder will most likely be the initiator of a transactional communication, however, he or she might also be approached by another party and may then use the transactional flash cards to communicate. Typical second parties might be merchants, waiters or any other persons who are approached by the cardholder or are offering to sell a product to the cardholder; or an agent who is providing an experience that the cardholder intends to see, or be part of etc.

The term "transaction" describes an exchange between two parties. The transactional flash card performs a transaction for the cardholder because it describes three aspects of this transaction: 1. its goal, 2. the intent of the parties to perform the transaction and 3. informs the parties of the goal of the transaction. A goal could be a purchase of a specific product, with the description of the intent being the description of the intent to purchase the same product with a phrase such as: "I would like to buy." The first two aspects of the transaction are written in both the first and the second parties' language. The third aspect, providing information on the goal of the transaction might comprise additional detailed background information on the product or service in the cardholder's language. This would be particularly helpful, for example, where such a product or service does not exist in the cardholder's country. There are a myriad of goals of transactions with their suitable description of the intent to achieve that goal and information on these various goals. Some examples of descriptions of the intent are verbs like: to purchase, order, buy, acquire, see, be part of etc., all with the goal being the provision of a service or consumable item, entertainment, an experience etc. The description of the goal would be a description of that service, or consumables item, entertainment, experience etc.

The communication with the second party is twofold: textual and visual: (a) textually the flash cards communicate the name describing the goal of a specific transaction together with a phrase describing the intent to achieve this goal written in the second party's language in its idiomatic characters which are prominently displayed on the flash card; and (b) visually an image of the goal of the specific transaction is displayed on the flash cards.

The information which transactional flash cards convey to the cardholder is also textual and visual: (a) text is displayed on the transactional flash cards in the card holder's language. This text may be displayed in smaller type than the name of the product. The text information may include a description of the goal of a specific transaction characteristics such as materials, ingredients, time needs etc. In addition, a navigational system comprising small icons may be provided on the face of the transactional flash card to quickly give the user general information while using less written text. This is important because space limitations may exist with the transactional flash cards. For example when the goal of the transaction is the purchase of a product, small icons might tell the cardholder the price ranges and what forms of payment are accepted; (b) an image of the goal of the transaction will also be readily understood by the card holder.

The transactional flash cards may be presented in the form of printed cards or they may be displayed on the screen of any portable electronic device such as a personal digital assistant (PDA). Currently available PDAs, such as those sold under the trade names "Palm Pilot®" (Palm, Inc.), or "Jomada®" (Hewlett-Packard), and "IBM Workpad®" (IBM) are capable of running various calendar, address book, or memo pad applications that may be used to create and store short documents. Some PDAs also have wireless-communication capability that permits them to transmit and receive data via a wireless network. The wireless connection may be used to transmit and receive many different types of information. For example, many wireless-enabled PDAs comprise a Web browser to permit the user to download and display Web pages from the Internet. Others use the wireless connection to transmit and receive e-mail. Another use of the wireless connection is to download applications to the PDA. A number of available PDAs permit users to load various applications adapted to perform specific tasks. The specific type of portable electronic device on which the transactional flash cards will be displayed is not critical.

The transactional flash cards in their printed form may also contain a playing card symbol such as suits (e.g. hearts, diamonds, clubs or spades), and a number (e.g. deuce through ace), adding a leisure function so they may also be used to play card games such as to pass time while waiting in an airport.

The transactional flash cards when displayed on the screen of an electronic device may also contain a navigational system with small icons which when selected would link the cardholder to more information stored in the electronic device's memory (e.g. games, word processor, messaging, paging, etc.). Likewise, the navigational icons may link the cardholder to the internet. The advantage of using an electronic device to store the transactional flash cards is that such a device can store a large number of such flash cards in various languages.

Where the transactional flash cards are displayed on an electronic device, the device may also contain link via internet, telephone, wireless modem, etc., to the card holder's financial institution, allowing the card holder to pay for transactions by transferring funds directly from his or her account to the account of the second party. This payment system might be accessed through an icon of the navigational system described above. The cardholder would simply type the price of the product into the electronic device (which would contain a keyboard), and the product or service would be charged to his account at the contacted financial institution. A security system could be instituted with PIN code or any other known access securing technology.

The electronic device may incorporate a built in speaker to allow transactional communication with to a second party by sound. The card may generate a voice which would speak the words for the cardholder and describe to the second party the goal and intent to perform the transaction. This would be helpful where the cardholder wishes to perform a transaction with a second party who can not read his or her own language.

The dimensions of the transactional flash cards and other design elements as boxes, rows columns, letters, pictures, and other variables as material etc. and quantities specified herein are not critical to the invention, and so may vary so long as the essential nature of the invention is retained. This is also true of the way information is displayed on the transactional flash cards or on a screen of any portable electronic device.

With reference now to the drawings, FIG. 1 shows a transactional flash card 1 which embodies the concept of the present invention in its print form on paper or any other suitable substrate. The transactional flash card 1 is used for the method described in this invention. It is noted that the possible versions of the flash card 1 of FIG. 1 are myriad (i.e. limited only by the individual goals of the particular transactions that may be featured on a flash card of the present design). The description of this single embodiment of a transactional flash card, therefore, is not intended to limit the present invention, and the transactional flash cards may be varied within the spirit of the present invention to assist the cardholder with as many transactions as is possible.

The transactional flash card 1 may, for example, serve a cardholder who is a traveler and who has as a goal of a transaction the purchase of a product from a second party which in this case is a foreign sales agent who doesn't speak the same language as the traveler. This embodiment may also apply to domestic instances where two parties speak different languages. For the foreign traveler, the transactional flash card 1 serves the cardholder in four ways:

(1) The transactional flash card 1 enables a traveler in a foreign country to purchase a product by showing this transactional flash card 1 to a foreign sales agent. The flash card 1 may be used to communicate with the sales agent in two ways: first by displaying the name of the product 2, together with a phrase describing the first party's intent to purchase the product 3, both of which are displayed in the language of the second party, and both of which are written in that foreign language and prominently displayed on the transactional flash card; second an image of the product 4 desired to be purchased which will clarify the traveler's choice of product even further and will help if the sales agent is not able to read the name of the product 2 in his or her own language.

(2) The transactional flash card 1 informs the traveler about the product he might want to purchase by displaying, in the traveler's language, information on the product 5 such as translation of its name and, if possible, information such as a brief description of the product, where to find the product, its price range, how to consume it, material of construction and other general and specific information. This information on the product 5 in the traveler's language is displayed much less prominently than the name of the product 2 so as not to confuse the foreign sales agent. Together with the information on the product 5 there are also small icons 6 which direct the traveler to specific categories of information without having to read the complete text. The image of the product 4 besides helping the foreign sales agent also serves the traveler as information on how the product should look.

(3) If the goal of a transaction has a payment involved as in this embodiment of the invention, a question about the price 7 in the language of the foreign sales agent, written using the characters of that language, can be displayed together with a translation of that same question into the traveler's language 8.

(4) The transactional flash card 1 may contain a leisure feature for the traveler. The transactional flash card 1 has playing card symbols 9 displayed on its face. The traveler may, therefore, use the transactional flash card 1 to relax while traveling. The game function is, of course, not required to perform the service of assisting the traveler in purchasing a product from a sales agent he doesn't understand, but such an additional feature adds to the attractiveness and functionality of the the transactional flash card 1. Where the transactional flash card 1 is provided with such a game feature, it may only be printed on one side due to the need for uniformity on the reverse side. As a result, the reverse side may be used to advertise products, web sites etc. If the game feature is omitted, a second flash card could be included on the back as well, reducing the total number of flash cards a traveler would be required to carry.

Figure 2:
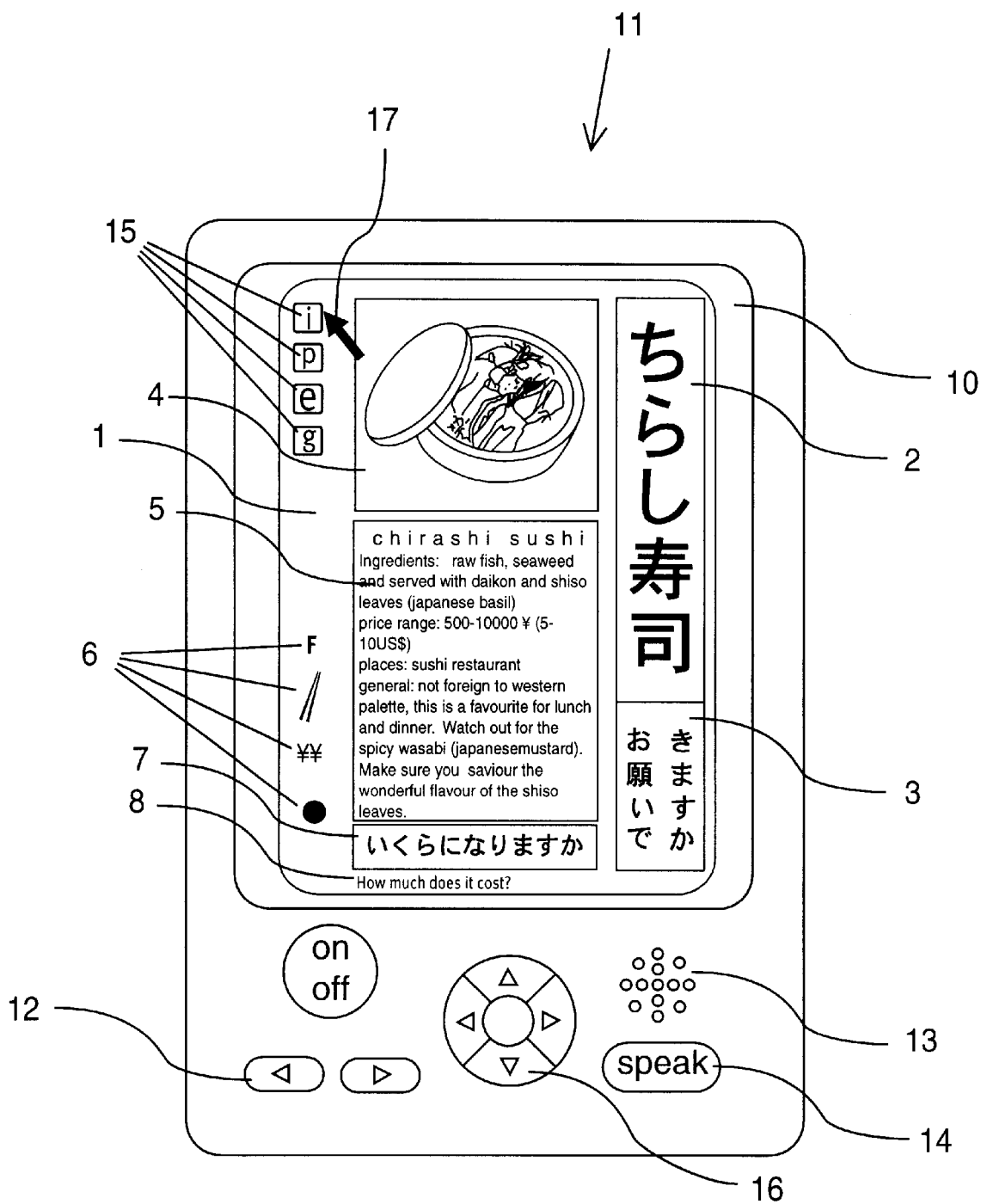
FIG. 2 is a top view of a transactional flash card of the current invention displayed on a screen of a portable electronic device.

FIG. 2 displays a transactional flash card 1 on a screen 10, for example, an LCD, LED or any other suitable screen, of a portable electronic device 11. The transnational flash card 1 on the screen may be used in exactly the same manner as the transnational flash card 1 in print form. As such, transnational flash card 1 on the screen serves the traveler in the same three ways described above, simply using a different media. To change the transnational flash cards 1 on the screen 10 a forward or backward button 12 is pressed. These buttons are readily available on most electronic devices 11 and where a particular electronic device 11 doesn't contain these exact buttons 12, other keys may be assigned to perform the function of changing from one transnational flash card 1 to another. If the electronic device 11 has a touch screen the buttons 12 may be provided directly on the screen. Alternatively, a screen stylus capable of interacting with a screen may perform this function. The transnational flash cards 1 could further be indexed on a content page which might aid the user in retrieving the desired flash card 1 quickly. Another commonly used feature would be a keyword search for quickly finding a particular flash card.

The only feature lost in using the electronically displayed embodiment of the transnational flash card 1 is the playing card feature 9, since the cards are stored within the memory of the electronic device 11 and are not physically available as would be required for a card game.

Where the handheld electronic device 11 has a connection to the internet, a navigational system with links may be displayed on the transnational flash cards 1. These links may be established with active buttons 15 on the screen which are activated when the user selects the button directly or by use of a cursor 17. The cursor may be moved with a built in mouse 16, or an external mouse, or a joystick etc. The buttons 15 may also establish links when touched on an interactive touch screen with a special stylus or by hand, or they may be established by voice recognition software. The links may significantly increase the functionality of the transnational flash cards 1, for example providing access to additional information on a product or service. Through one of the special icons 15 of the navigational system the transnational flash card may establish via internet, telephone, wireless etc. a link to the card holder's financial instution. The cardholder can then type the price of the product and charge it his or her account at the financial instution. A security system may be instituted, using for example a PIN code or any other access securing technology.

The text on the cards may also be activated to establish links to sites on the internet. In a non-limiting example, the name of an ingredient could be active, linking the user to a site that might explain the ingredient further to and inform the user where it might be purchased. In this way the traveler may also have access to an internet or internal game function. This would replace the leisure function of the playing card symbols 9 available in the transactional flash cards 1 in the printed form.

In yet a further embodiment, the electronic device 9 might have a built in speaker 13 which, in combination with the memory of the electronic device, could say the name of the product or service desired to be purchased to the foreign sales agent when a button 14 is pressed.

Figure 3:
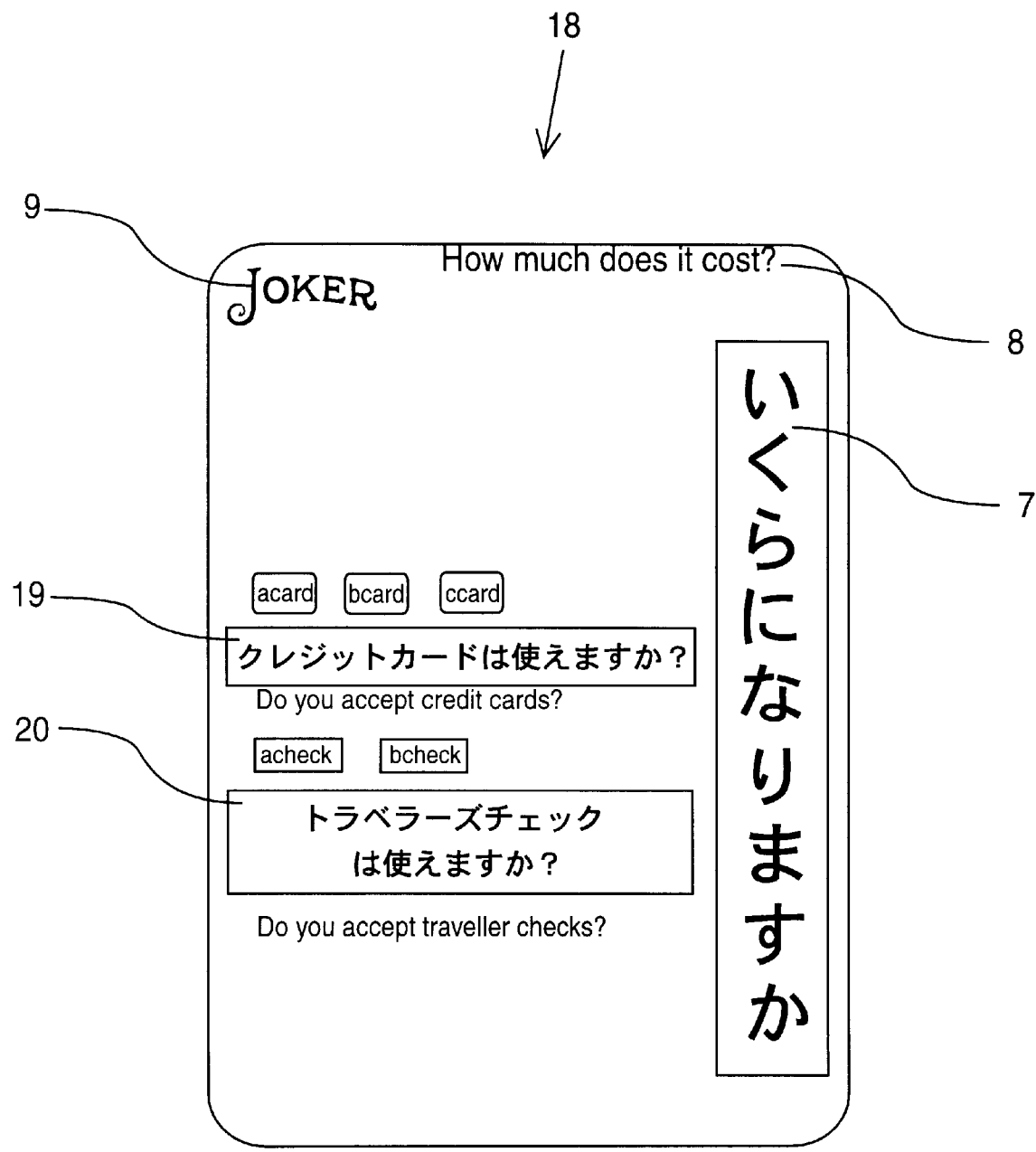
FIG. 3 is a top view of the transactional flash card of FIG. 1 further displaying a question written in the characters of a foreign language.

FIG. 3 shows a special transactional flash card 18 which displays the question about the price of the product 7 in the foreign language written with the characters of that foreign language prominently displayed. This flash card 18 displays the same question as on the transactional flash of FIG. 1, but in a more emphasized fashion. Such an embodiment be useful in the situation where there are no price tags attached to a product or service. As with the transactional flash card 1 of FIG. 1, a translation of the question about the price 8 also appears in smaller type in the traveler's language. Additionally included is a question in the second party's language, in this case that of a foreign sales agent. Such language could inquire whether credit cards are accepted 18, using the icons of common credit cards, or whether traveler's checks are accepted 19 together with icon of common traveler's check companies.

Figure 4:
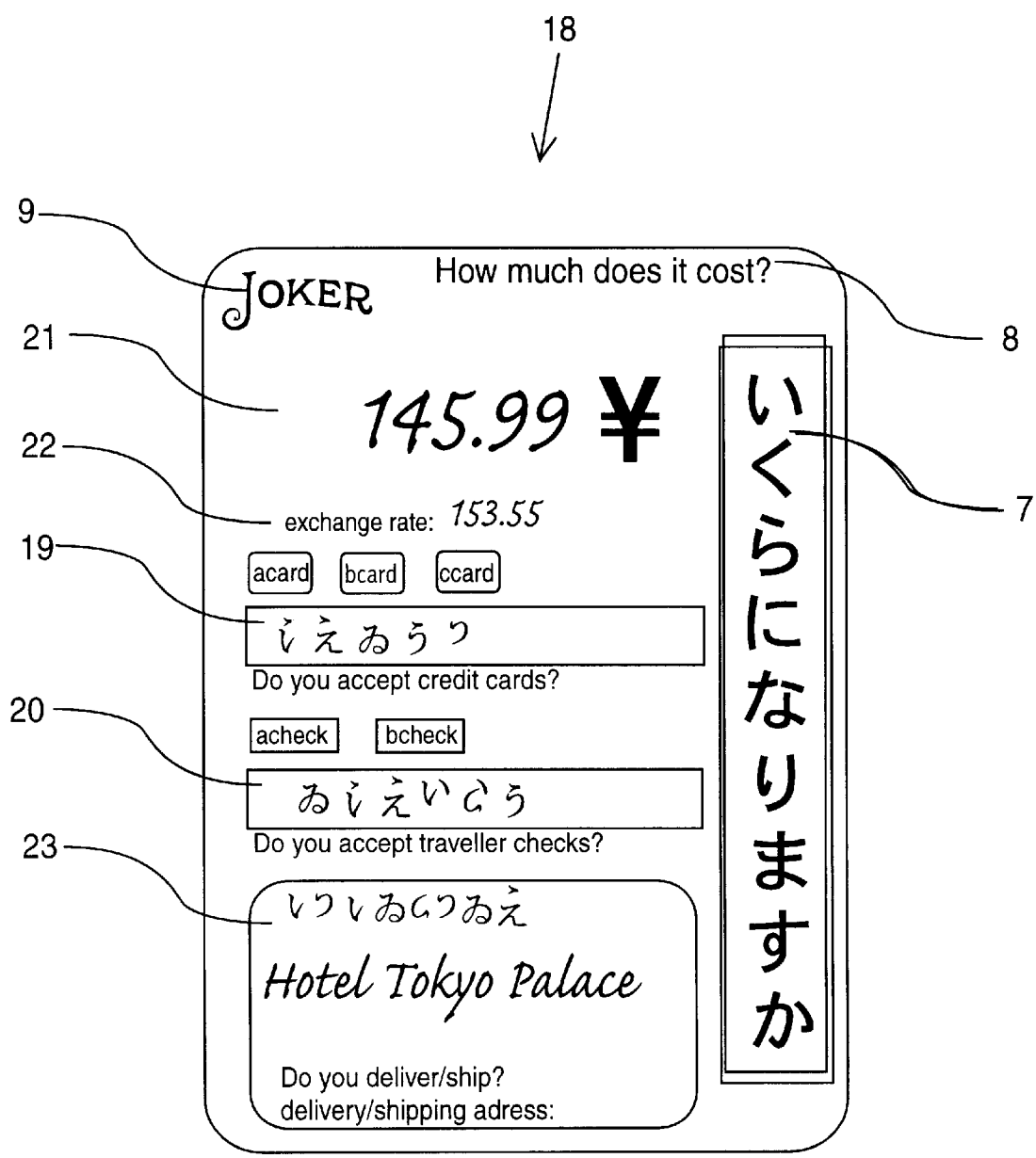
FIG. 4 is a top view of the transactional flash card of FIG. 3 incorporating erasable surfaces.

FIG. 4 shows the special transactional flash card 18 of FIG. 3 with two additional erasable surfaces 21 and 23. The surface 21 is provided so the sales agent may hand write his offer price and the traveler can erase that price if he would like to suggest a lower price. In this way a clear communication about the price is possible in the case where there are no price tags attached to a product, the common sign language dealing with numbers fails, or where the user simply would like to negotiate the price. Within the erasable surface 21 there is also a space 22 where the cardholder may enter and erase the exchange rate. The second erasable surface 23 may contain a question such as "do you deliver or ship?" followed by the words "delivery/shipping address." On the surface 23 the traveler can enter his travel or home address in the case in which the first question is answered in the affirmative.

Figure 5:
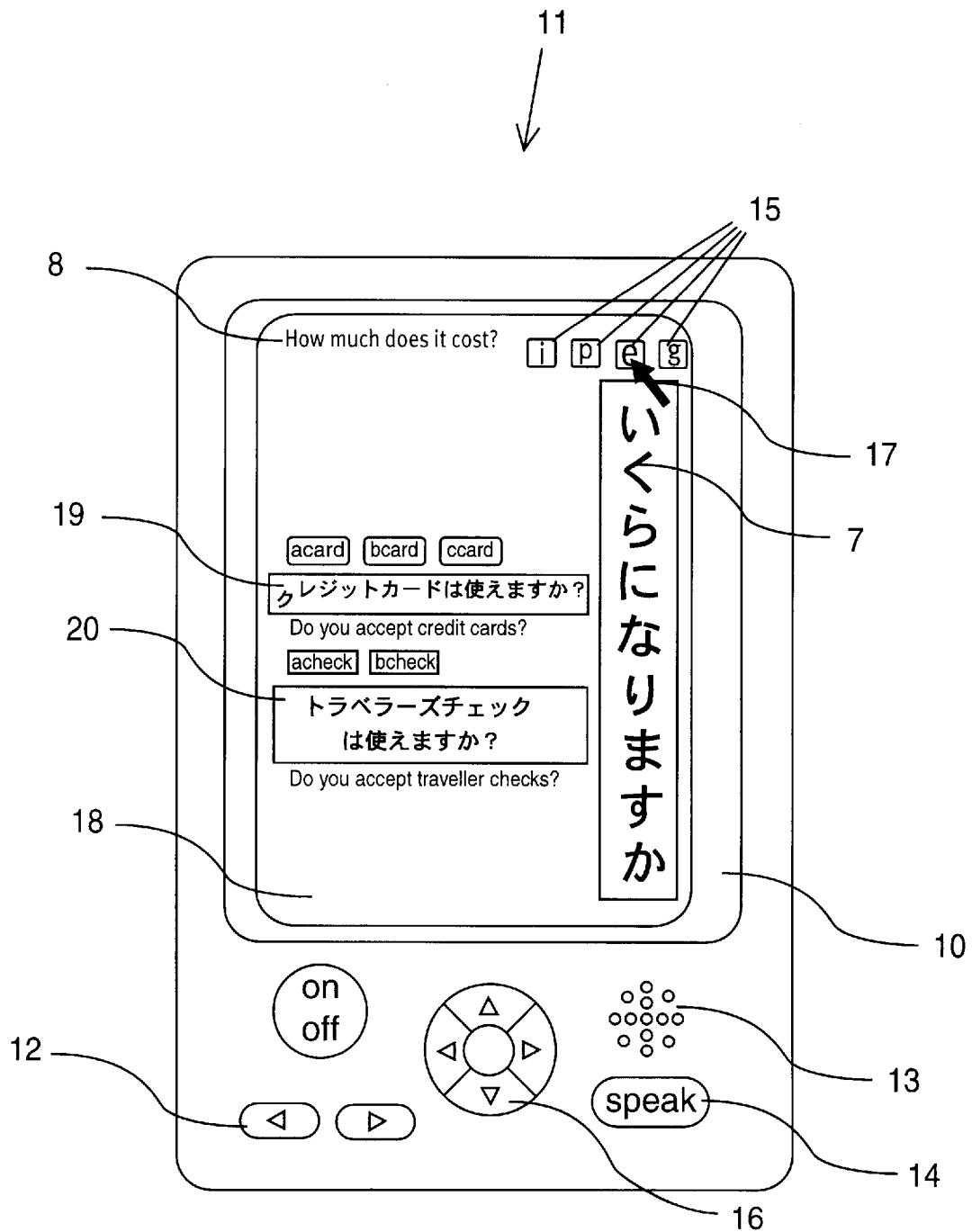
FIG. 5 is a top view of the transactional flash card of FIG. 3, further displaying the flash card on a screen of a portable electronic device.

FIG. 5 displays the transactional flash card 18 of FIG. 3, further displaying the flash card on a screen 10 as for example an LCD, LED or any other suitable screen of any portable electronic device 11. The special transactional flash card 18 displayed on a screen 10 has the same feature as the special transactional flash card 18 in print form displayed in FIG. 3. In this embodiment, next to the question about the price of the product 7 in the foreign language, a translation of that question 8 in the traveler's language is displayed. As described in the text on FIG. 2 this embodiment may provide links to internet sites and search engines etc. from which the user may obtain additional information on the product or service.

Figure 6:
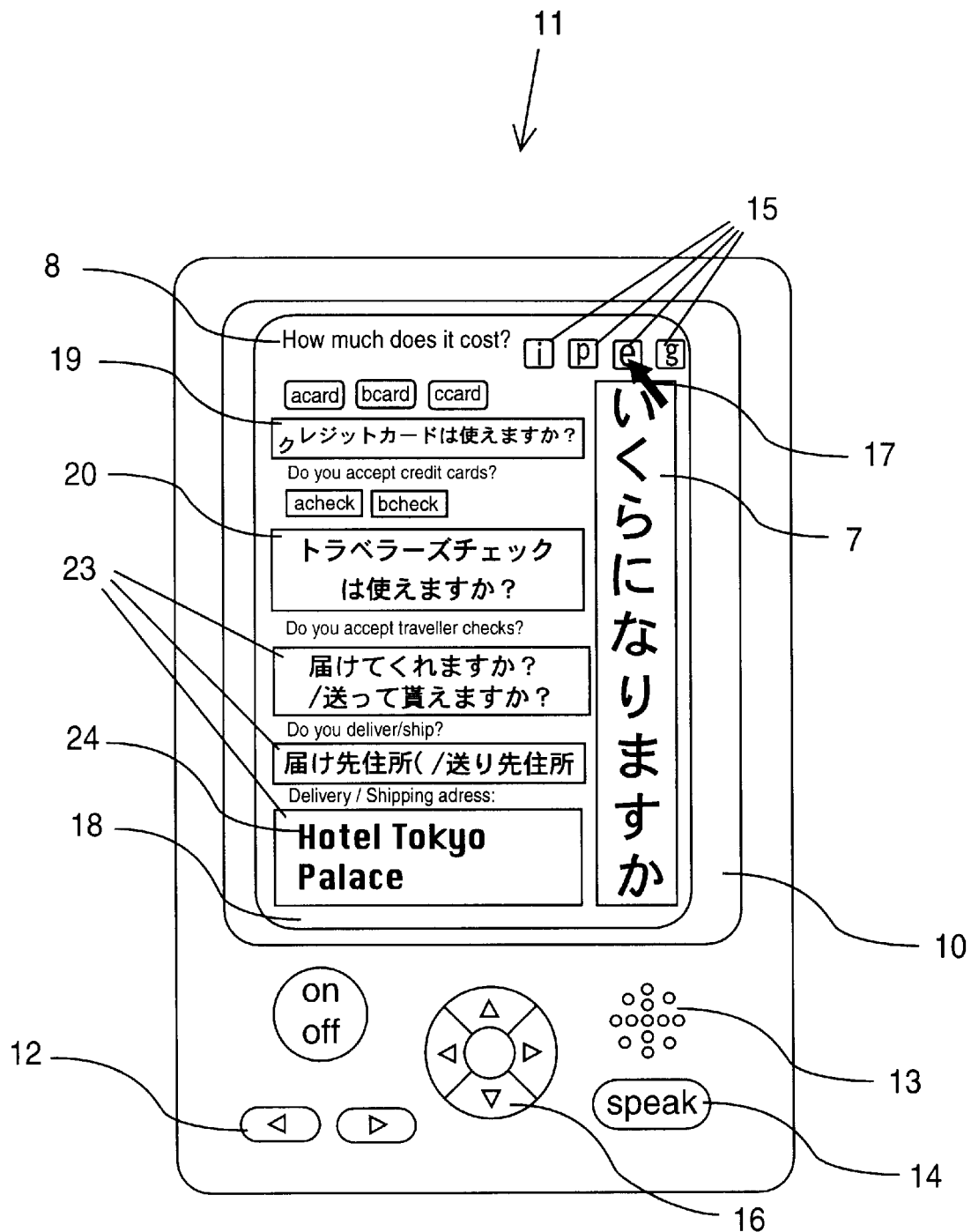
FIG. 6 is a top view of the transactional flash card of FIG. 5 further displaying a question about shipping and delivery on the screen.

FIG. 6 shows the transactional flash card 18 of FIG. 3 being displayed on the digital screen 10 of a hand held electronic device 11, where the question about shipping and delivery is displayed on the screen. In the electronic version, the address may be entered by keyboard, or by special stylus that interacts with the screen, or by any other means known in the art.

Figure 7:
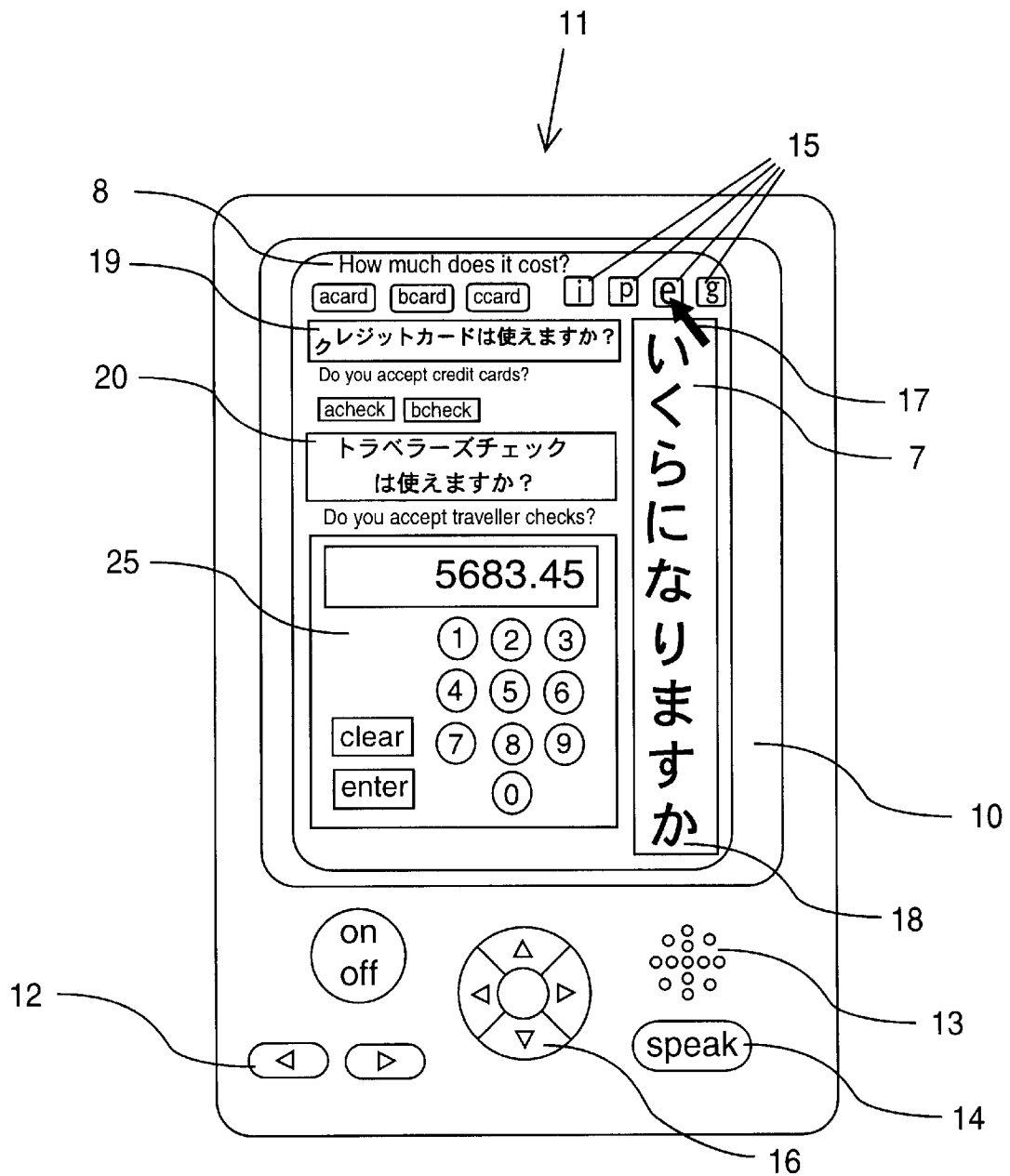
FIG. 7 is a top view of the transactional flash card of FIG. 5 where the electronic device further comprises a calculator.

FIG. 7 shows the transactional flash card 18 of FIG. 5 where the electronic device further comprises a calculator 25. Such a calculator function may allow the traveler to display the price of the product to more easily communicate with the sales agent or to compute the price into her/his native currency.

Figure 8:
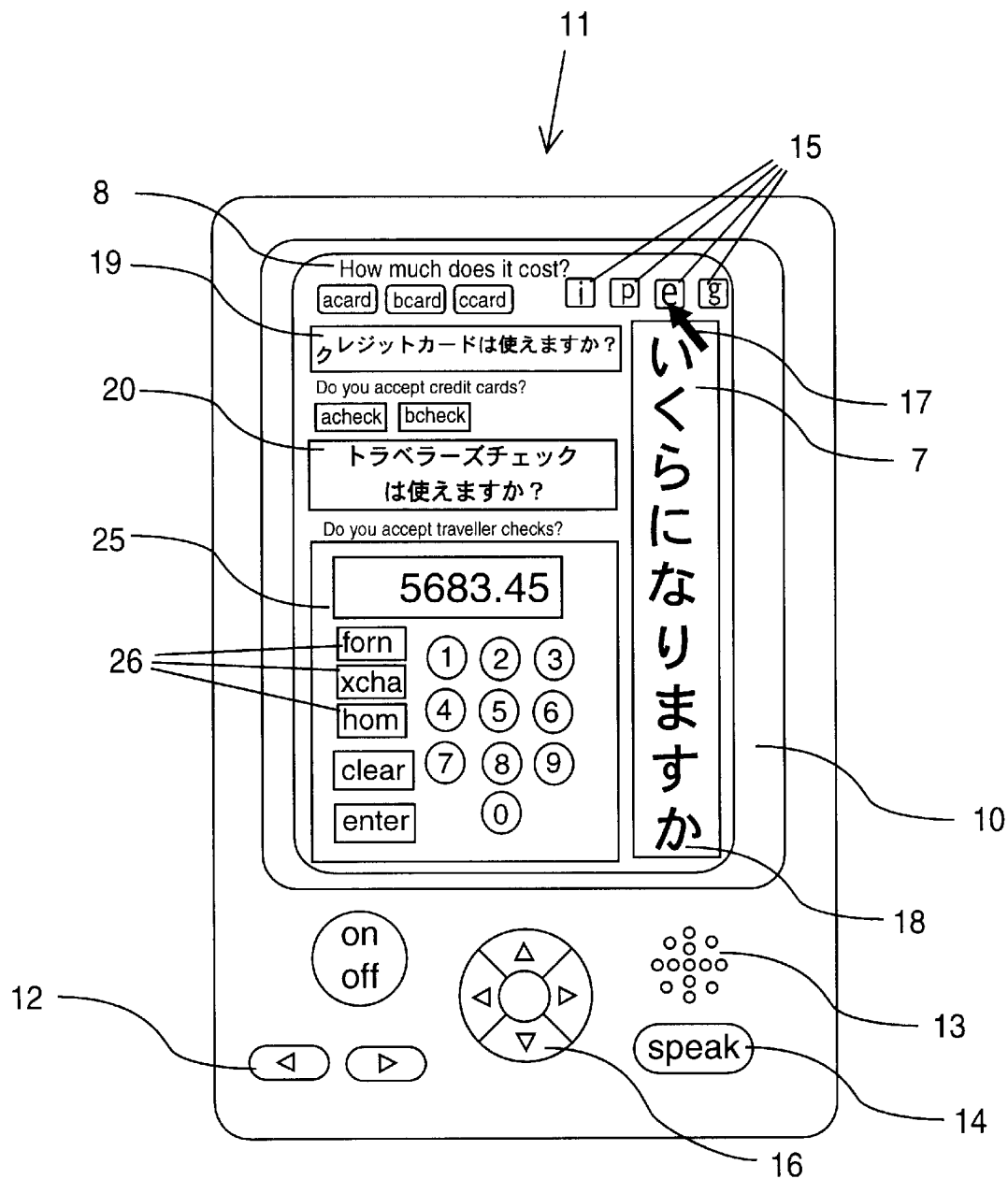
FIG. 8 is a top view of the transactional flash card of FIG. 5 further comprising a currency converter.

FIG. 8 shows the transactional flash card 18 of FIG. 5 further comprising a currency converter. In the embodiment shown, three buttons 26 may be used to perform this function. The user would press "forn" and enter the price in foreign currency, then the user would presses "xcha" and enter the exchange rate, which could default to the last entered rate. Pressing "hom" would activate a programmed computation, internal to the electronic device's memory, to produce the price in the user's own currency. Any other acronyms than "forn", "xcha" or "hom" could be used without changing the character of this function. Further, if the electronic device has access to the internet, a link could be used to connect to a financial service that would automatically update the exchange rate and automatically use it in the above computation.

Figure 9:
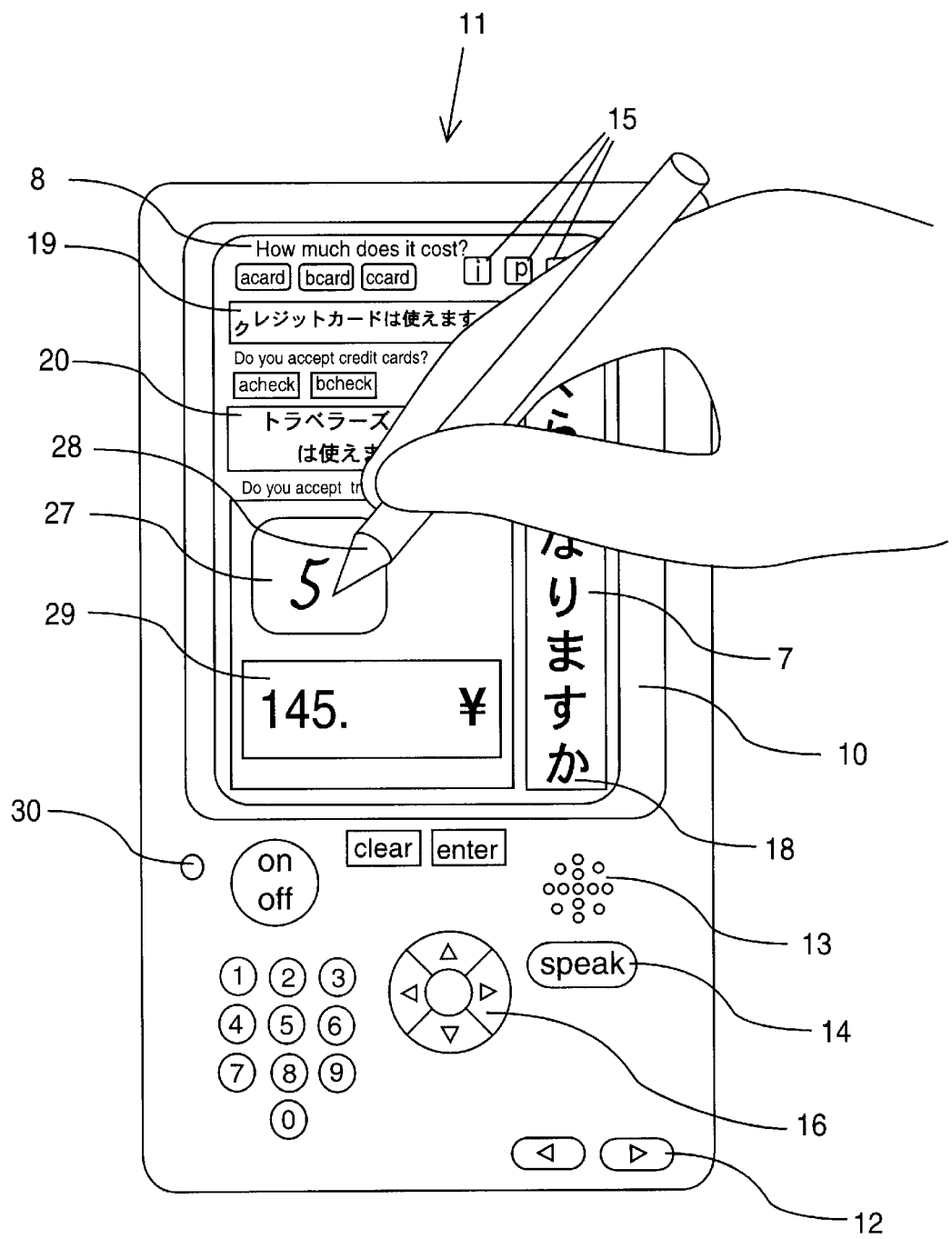
FIG. 9 is a top view of the transactional flash card of FIG. 5 further comprising an interactive surface where transactional information may be entered with an interactive stylus and which information will be displayed in an area of the flash card.

FIG. 9 shows the transactional flash card 18 of FIG. 5 further comprising an interactive surface 27 where the cardholder or the second party may enter transactional information with an interactive stylus 28, and which information will be displayed in an area of the flash card 29. The electronic device 11 may further comprise a microphone 30 and voice recognition software to allow the user or second party to speak into the electronic device and display the words or their translations in the area 29.

Accordingly, it should be understood that the embodiment herein is merely illustrative of the principles of the invention. Various other modifications may be made by those skilled in the art which will embody the principles of the invention and fall within the spirit and the scope thereof.

What is claimed is:

1. A method of performing a transaction between first and second transaction parties, comprising the steps of:
    (a) providing at least one transactional flash card containing a display comprising a text understandable to the first party and text understandable to the second party but not understandable to the first party, and an image, wherein both texts and the image describe a single transaction;

(b) selecting the at least one flash card so as to communicate the transaction; and (c) presenting the at least one flash card to the other second party;

wherein the transaction is communicated to the second party.

2. The method of claim 1, wherein the step of providing at least one transactional flash card further comprises providing the transactional flash card with a first phrase understandable to the first party and a second phrase understandable to the second party, wherein the first and second phrases describe an intent to perform the transaction.

3. The method of claim 1, wherein the step of providing at least one transactional flash card further comprises providing the transactional flash card with information understandable to the first party in addition to the text describing the transaction, wherein the additional information is not displayed as text understandable to the second party.

4. The method of claim 1, wherein the step of providing at least one transactional flash card further comprises providing the transactional flash card further with at least one icon containing condensed information regarding the transaction.

5. The method of claim 1, wherein the step of providing at least one transactional flash card further comprises providing the transactional flash card with text containing an inquiry about the price of the transaction.

6. The method of claim 1, wherein the step of providing at least one transactional flash card further comprises providing the transactional flash card with text containing an inquiry as to whether the second party prefers a particular form of payment.

7. The method of claim 1, wherein the step of providing at least one transactional flash card further comprises providing the transactional flash card with at least one icon containing an inquiry as to whether the second party prefers a particular form of payment.

8. The method of claim 1, wherein the step of providing at least one transactional flash card further comprises providing the transactional flash card with an erasable surface.

9. The method of claim 1, wherein the step of providing at least one transactional flash card comprises providing a set of at least 52 transactional flash cards, wherein each flash card in the set comprises a different playing card symbol such that the set comprises a deck of standard playing cards.

10. The method of claim 1, further comprising the step of providing an electronic device having a computer memory and a display screen, wherein the step of providing at least one transactional flash card comprises providing the transactional flash card in the computer memory so that the transactional flash card may be viewed on the display screen.

11. The method of claim 10, wherein the step of providing an electronic device further comprises providing an electronic device capable of accepting removable memory media.

12. The method of claim 11, wherein the step of providing at least one transactional flash card further comprises providing a transactional flash card with at least one prompt allowing the first and second party to view on the display screen information stored in the removable memory media.

13. The method of claim 11, wherein the step of providing an electronic device further comprises providing an electronic device capable of calculating and displaying an exchange rate and currency conversion for currencies of at least two different countries.

14. The method of claim 13, wherein the step of providing an electronic device further comprises providing an electronic device capable of connecting to the internet, and also capable of calculating and displaying exchange rates for currencies of at least two different countries,
wherein the electronic device communicates with at least one internet site to automatically obtain and display an exchange rate and a currency conversion when the names of two countries and one money amount are input to the device.

15. The method of claim 10, wherein the step of providing an electronic device further comprises providing an electronic device capable of connecting to the internet, and wherein the step of providing at least one transactional flash card comprises providing a transactional flash card with at least one prompt providing at least one link to an internet site.

16. The method of claim 15, wherein the at least one link comprises a connection to a financial institution capable of performing payment transactions upon instruction from a user of the electronic device.

17. The method of claim 15, wherein at least one link comprises a connection to an internet site capable of providing additional transactional flash cards to the electronic device.

18. The method of claim 10, wherein the step of providing an electronic device further comprises providing an electronic device comprising a calculator capable of performing and displaying results of at least basic mathematic functions.

19. The method of claim 10, wherein the step of providing an electronic device further comprises providing an electronic device comprising at least one surface on which information may be entered into the electronic device by using a stylus.

20. The method of claim 19, wherein the step of providing an electronic device further comprises displaying the information entered into the electronic device by the stylus.

21. The method of claim 10, wherein the step of providing an electronic device further comprises providing an electronic device comprising a microphone, wherein the electronic device is capable of recording sound entered using the microphone, and further wherein a representation of the sound is provided on the display screen.

22. A device for facilitating a transaction between at least first and second parties who don't understand each other, comprising:

at least one transactional flash card having a front side and a back side, at least one side having a display comprising text understandable to the first party and different text understandable to the second party, and an image, wherein both texts and the image describe a single transaction.

23. The device of claim 22, wherein at least one of the transactional flash card front or back side further comprises a first phrase understandable to the first party and a second phrase understandable to the second party, wherein the first and second phrases describe an intent to achieve the transaction.

24. The device of claim 23, wherein at least one of the transactional flash card front or back side further comprises information understandable to the first party which is additional to the text describing the transaction and phrase, wherein the additional information is not understandable to the second party to the transaction.

25. The device of claim 22, wherein at least one of the transactional flash card front or back side further comprises an erasable surface.

26. The device of claim 22, wherein the at least one transactional flash card comprises a set of at least 52 individual transactional flash cards, wherein each flash card comprises a different playing card symbol so that the set comprises a deck of standard playing cards.

27. The device of claim 22, further comprising an electronic device having a computer memory and a display screen, wherein the transactional flash card is displayed in electronic form on the display screen.

28. The device of claim 27, further comprising a calculator.

29. The device of claim 27, wherein the electronic device further comprises a connection enabling communication with the internet.

* * * * *